United States Patent [19]

Stahl et al.

[11] Patent Number: 4,492,085
[45] Date of Patent: Jan. 8, 1985

[54] GAS TURBINE POWER PLANT

[75] Inventors: Charles R. Stahl, Scotia; Archie H. Perugi, Schenectady, both of N.Y.

[73] Assignee: General Electric Co., Schenectady, N.Y.

[21] Appl. No.: 406,124

[22] Filed: Aug. 9, 1982

[51] Int. Cl.³ .................... F01K 21/04; F01K 23/10; F02C 1/04
[52] U.S. Cl. .......................... 60/649; 60/674; 60/655; 60/683
[58] Field of Search .............. 60/649, 674, 655, 650, 60/682, 683

[56] References Cited

U.S. PATENT DOCUMENTS

| 479,707 | 7/1892 | Field ....................... 60/674 |
| 4,380,154 | 4/1983 | Eastman .................. 60/682 |

FOREIGN PATENT DOCUMENTS 56-12006  2/1981  Japan ..................... 60/674

Primary Examiner—Allen M. Ostrager
Attorney, Agent, or Firm—J. C. Squillaro

[57] ABSTRACT

The present invention relates to a gas turbine power plant wherein the gas turbine is driven by gases and steam heated indirectly through a heat exchanger by the burning of corrosive fuels. One of the main improvements in the present invention is to utilize a state-of-the-art gas turbine in the power plant.

26 Claims, 6 Drawing Figures

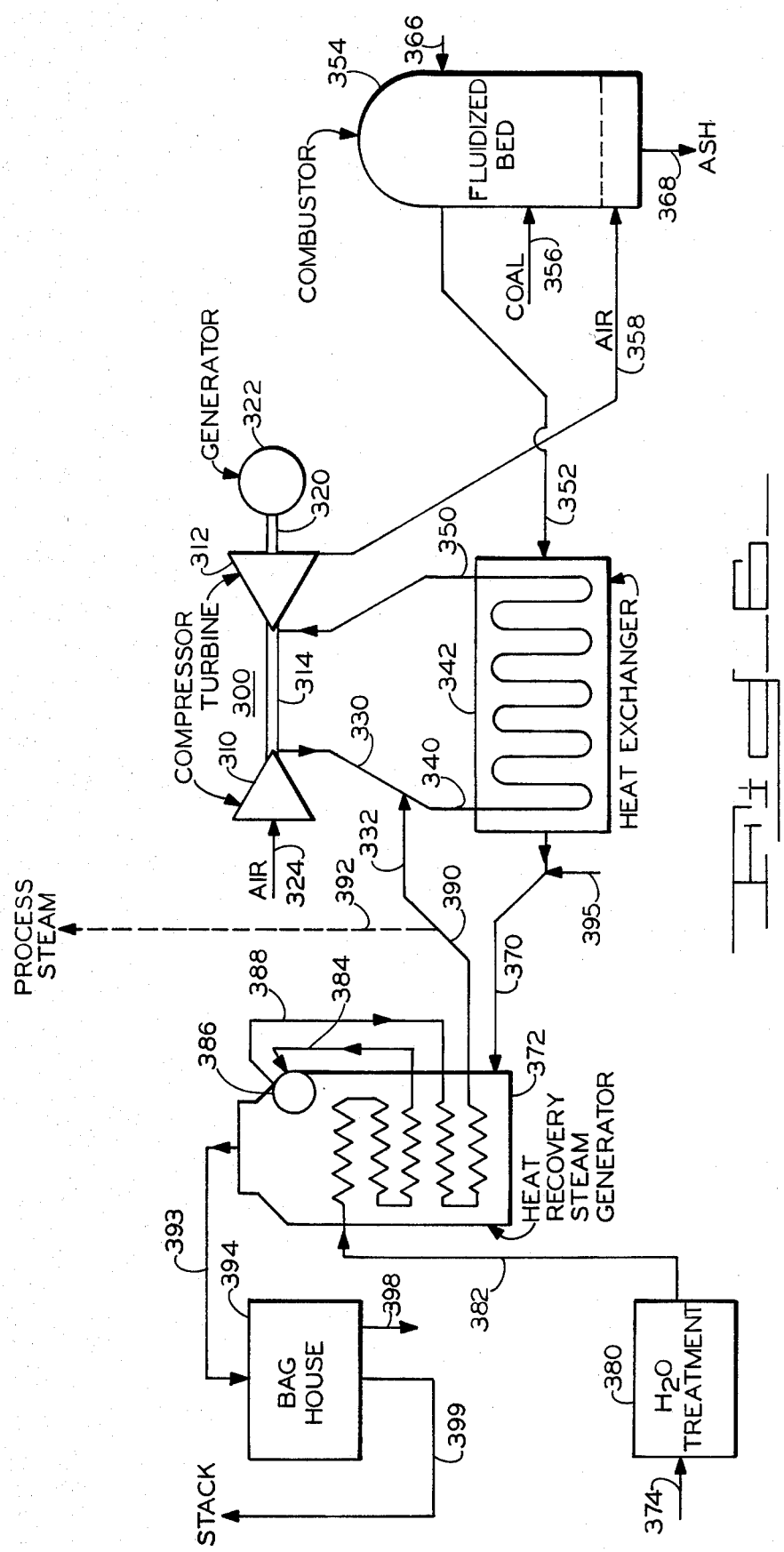

GAS TURBINE POWER PLANT

BACKGROUND OF THE INVENTION

The present invention relates to a gas turbine power plant, and more particularly, the present invention relates to a state-of-the-art gas turbine plant which is powered by a mixture of gases and steam.

The engines or devices that convert heat energy to mechanical energy are well known. Each of these engines belongs to one of four basic categories and have different heat energy cycles and efficiencies. Basically, those heat energy cycles and theoretical efficiencies are referred to as the Otto, Diesel, Brayton, and Rankine. Of these four cycles, the present invention is directed to those heat engines utilizing the Rankine cycle and those utilizing the Brayton cycle.

The Brayton heat engine cycle applies to a gas turbine engine which utilizes a heated gas driven power generating turbine while the Rankine cycle utilizes a steam driven turbine engine.

Each type of turbine engine has its own advantages. The gas turbine in its simplest application normally reaches about up to 30 percent efficiency, and is relatively light in weight for the amount of horsepower a particular unit can develop. The power-plant developing turbine normally runs at temperatures up to 2100° F. and at entering gas pressures up to 10-12 atmospheres using selected clean, non-corrosive fuels such as petroleum or natural gas. The steam driven power-plant developing turbine generally runs at temperatures of about 1000° F., limited by the steam boiler capability but utilizes pressures up to hundreds of atmospheres. Both high temperatures and high pressures increase power developing capability in a turbine. Each has found its use in industry and particularly in power plants.

There was a considerable amount of early work of attempting to devise a heat engine that would use steam and gases and would combine the benefits of both types of engines, steam and gas driven turbines. For early work in this area see, for instance, U.S. Pat. No. 708,027, U.S. Pat. No. 583,240, and the like.

Recently and especially in view of the oil embargoes, there has been a drive to utilize indigenous fuels and particularly solid fossil fuels and other solid fuels of which there is a great abundance in the United States rather than petroleum or natural gas fuels. When solid fuels are used in a gas turbine, they must be gasified, liquidified, or burned in solid form in a direct air suspension and cleaned if the combustion products are to be passed directly through the turbine. Alternatively, the solid fuels can be burned in an external combustion chamber utilizing heat exchangers to transfer thermal energy to drive the gas turbines. One effort in this area was that of Willyoung, U.S. Pat. No. 4,116,005. This patent discloses the utilization of a carbonaceous fuel powered gas turbine. A carbonaceous fuel such as, for instance, a slurry of coal, could be combusted to heat a compressed stream of air through a heat exchanger to a temperature in the range of 1200°-1500° F. and which would then be used to drive a gas turbine. The same heat exchanger-combustor was also used to turn water into steam which could be utilized to drive a steam turbine. The dual gas turbine-steam turbine was utilized in this system so as to increase the overall efficiency of the conversion of the heat energy available from one of the carbonaceous fuels. It is desirable to obtain additional power from the gas turbine in this system since the air that is utilized to drive the gas turbine can only be heated to a maximum temperature of up to 1500° F. as a result of the corrosion tolerance of the metals utilized in such state-of-the-art heat exchangers even though most gas turbines are made of metals and also utilize blade cooling devices so that they can use non-corroding clean gases at temperatures of up to 1800°-2100° F.

It must also be appreciated that indirect heating of the air stream was used to drive the gas turbine since the direct combustion gases from the carbonaceous fuel could not be utilized directly to drive the gas turbine. Such Combustion gases could not be used to directly drive the gas turbine since they would corrode and degrade the metal of the gas turbine. Accordingly, an indirectly heated, compressed air stream which was heated in a heat exchanger by burning a carbonaceous fuel was utilized.

Further, due to the temperature tolerance of the state-of-the-art heat exchanger and as a result, of the limited temperature to which the gas stream was heated, the gas turbine engine alone could reach less than 20 percent efficiency. For the overall plant. however, the efficiency was increased by using the same heat exchanger apparatus to provide steam to drive a steam turbine and also by taking spent gases—particularly spent air—from the gas turbine and utilizing it regeneratively to burn the fuel in the combined combustor heat exchanger.

A different variation of such a dual use of gas turbine and steam turbine powered by the burning of carbonaceous fuels wherein the carbonaceous waste gases after being cooled were utilized to drive a second gas turbine, is disclosed in Willyoung, U.S. Pat. No. 4,223,529. However, this disclosure still does not show a gas turbine which is operated at the present state-of-the-art maximum temperature or efficiency because it again is powered by air heated indirectly through a heat exchanger by the burning of a carbonaceous fuel. There is also Kydd et al., U.S. Pat. No. 3,693,347 which discloses the use of a controlling means to optimize the injection of steam into combusted gases to drive a gas turbine. The gas turbine of this patent was not operated by the utilization of indirectly heated gases to drive the turbine; instead the gas turbine was driven directly by a mixture of combustion gases, and steam passing through the power generating turbine. It is important to note in this disclosure, and particularly Column 2 of the patent, the problems associated in the past with the use of steam injection in such gas turbines and how the inventor controls such problems or minimizes such problems as the result of his control over the steam injection rate.

Another method that was utilized to increase the efficiency of a gas turbine system operated by indirectly heated compressed gaseous streams through a heat exchanger by the burning of carbonaceous fuels, is to take the compressed gases after they had passed through the heat exchanger and add to them a clean hydrocarbon fuel and combust the mixture so as to increase the temperature level of the gaseous combustion product stream to 1800°-2100° F. and then use this combusted gas mixture to drive the gas turbine; see Willyoung, U.S. Pat. No. 4,253,300. By utilizing this method, there was able to be achieved an efficiency in the gas turbine engine alone of about 30 percent. However, the disadvantage of such a system was that it did not draw all its energy from the burning of the carbonaceous fuels and required additional expenditures for clean hydrocarbon fuel.

Accordingly, it was highly desirable to increase the efficiency of a commercially established state-of-the-art gas turbine which was powered by air or gases heated by indirect means. This is particularly true when the temperature capability of the gas turbine is considerably higher than that for the heat exchanger, which isolates the gas turbine from potentially destructive stream combusted gases forcing a derating of gas turbine inlet temperatures, rating and efficiency. Another heat engine that utilized both steam and a combusted gas is disclosed in Cheng, U.S. Pat. No. 3,978,661. However, the heat engine, or in one aspect the turbine, of U.S. Pat. No. 3,978,661, is driven or powered by both steam and clean combusted gases and had to be specially designed and built to meet those specifications. U.S. Pat. No. 3,978,661 nowhere discloses the use of a state-of-the-art gas turbine which could be operated by a combination of indirectly heated gases and steam such that the engine or the turbine could reach an efficiency of about 30 percent or the same value it would theoretically achieve if solid fuels could be fired directly.

Accordingly, it is one object of the present invention to disclose an improved power plant which utilizes a state-of-the art and commercially available gas turbine operated at derated turbine inlet temperature conditions which is powered by a combination of indirectly heated steam and gases.

It is an additional object of the present invention to disclose an improved power plant utilizing a state-of-the-art gas turbine which is powered, in part, by a gaseous stream heated indirectly by the burning of a carbonaceous fuel—such as, for instance, a coal slurry.

It is still an additional object of the present invention to provide an improved power plant in which there is a state-of-the-art gas turbine which is powered by both steam and an indirectly heated gas stream, both of which are heated and formed by passing them through a heat exchanger, and by the burning of a carbonaceous fuel.

It is yet an additional object of the present invention to provide an improved power plant having therein a state-of-the-art gas turbine powered by both gases and steam which are indirectly heated by the burning of wood or other biomass fuels.

It is a further object of the present invention to provide an improved power plant in which a state-of-the-art gas turbine is powered by gases and steam indirectly heated by the burning of a fossil fuel which gives off corrosive gases, and in which the gas turbine reaches an efficiency in the neighborhood of the value it would theoretically achieve when fired directly.

It is still a further object to the present invention to provide a process for operating an improved power plant having therein a commercial state-of-the-art gas turbine which is powered by an indirectly heated mixture of steam and gases such as air, and which gas turbine plant reaches an efficiency of about the same value it would theoretically achieve if the same fuel could be fired directly.

The objects of the above invention, as well as their attainment, are more fully disclosed in the Figures below.

FIG. 6 is a schematic diagram of an alternate embodiment of the invention.

Figure 1:
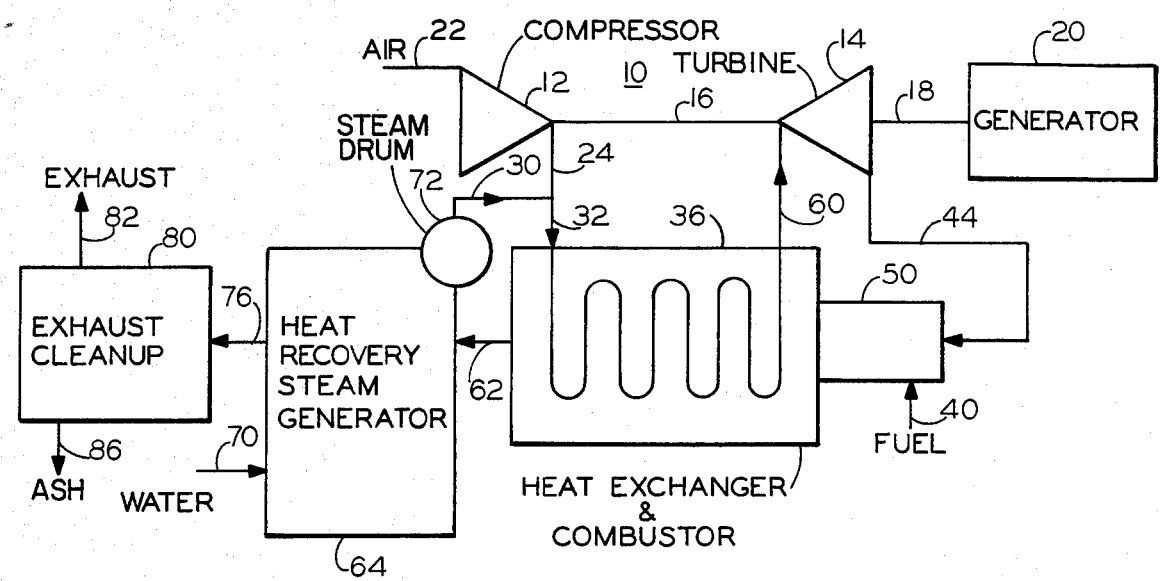
FIG. 1 is a schematic diagram of a state-of-the-art gas turbine operated or powered by a mixture of steam and air which is indirectly heated by the burning of a carbonaceous fuel.

The purpose and function of the different parts of the power plants set forth in these diagrams will be more fully explained below.

SUMMARY OF THE INVENTION

In accordance with the objects, there is provided by the present invention an improved gas turbine power plant using a state-of-the-art gas turbine comprising:

(A) a state-of-the-art gas turbine apparatus having at least one gas-driven turbine section and a compressor section for supplying a first pressurized gas stream;

(B) a combustor for burning a carbonaceous fuel to provide heat energy for driving said turbines;

(C) at least a first heat exchanger for transferring a portion of the heat energy provided by said combustor to said pressurized gas stream; and (D) at least a first heat recovery steam generator which converts water to a first steam flow wherein said first steam flow is mixed with the pressurized gaseous stream from such compressor section to form a gaseous mixture, and wherein such gaseous mixture is fed to the turbine section.

There are several important elements to the present invention that notice should be taken of. First of all, an impure carbonaceous fuel such as coal or wood is burned in the combustor. These fuels give off gases and particulate matter which are potentially corrosive to turbine metals. Specifically the impure fuel could be slurry of coal or wood particles, or the volatilized gases from wood or other biomass particles. One component of heat from the stream of combusion gases is transferred to the gas turbine gas stream by means of a heat exchanger. Another portion of the heat from the combustion gases is utilized to turn water into steam either in a separate unit or by passing the water directly through the heat exchanger along with the compressed gases which are preferably air. In this case the steam is mixed with the compressed gas stream and is further heated in the heat exchanger to power a state-of-the-art gas turbine.

By state-of-the-art gas turbine, it is meant a gas turbine which is specifically made for the burning thereof or for being powered directly by combusted gases which are heated to a high limiting temperature that can be tolerated by the gas turbine metals and which are produced by burning a clean hydrocarbon fuel (i.e., a fuel which when burned produces an acceptably low level of destructive particulates and corrosive compounds.). The term "state-of-the-art gas turbine" does not include any gas turbine which is specifically modified, designed or manufactured for the utilization of massive amounts of steam therein (i.e., steam 5% or more of the total turbine mass flow). By the state-of-the-art gas turbine, it is meant a turbine which is designed and built to be operated or powered by the burning of standard and traditional clean hydrocarbon fuel combusted gases.

It should also be appreciated that all the other components of the power plants that will be discussed below and which are shown in the above figures, are commercially established state-of-the-art equipment which meet standard specifications and criteria for such equipment.

It is the novelty and unobviousness of the present invention to produce a gas turbine power plant using a state-of-the-art gas turbine and in which the other elements of the power plant are state-of-the-art equipment where the gas turbine inlet temperature is reduced from the state-of-the-art capability of the gas turbine elements in order to permit the burning of corrosive solid fuels, but which nevertheless result in a power plant operating at about 30 percent efficiency or about the same efficiency level that would theoretically be obtained in a simple cycle direct-fired gas turbine system.

DESCRIPTION OF THE PREFERRED EMBODIMENT

There can be utilized any fossil fuel in the combustor-heat exchanger of the instant case. However, preferably, there is utilized—and the advantage of the invention is in the utilization of—a solid fuel which gives off corrosive gases such as coal, peat, wood, etc.

Referring to one embodiment of the instant invention, and particularly the one shown in FIG. 1, there is disclosed a turbine apparatus 10 comprising a compressor section 12 and a turbine section 14. The compressor section 12 and turbine section 14 are in tandem or on the same shaft 16 along with shaft 18 so that turbine section 14 can drive directly, for instance, an electric generator 20 and compressor section 12. Any type of gas can be inducted into compressor section 12 through line 22 whether the gas be combustible or non-combustible since in the instant invention, the turbine section 14 is not powered by combusted gases. Preferably air is forced through line 22 into the compressor section 12 since it is the cheapest gas that can be utilized to drive the turbine section 14 and for other reasons which will become apparent. Compressed air passes out of the compressor section 12 through line 24, and is mixed with steam coming from line 30. Although the ratio of steam to pressurized air can vary in all proportions, it is preferred that there be from 5-25 percent by weight of steam in the gaseous mixture. The above preferred levels are desired since the turbine section 14 operates most efficiently within these ratios without modification to the turbine design. The steam-air porportions of the mixture flow is related to the mixture temperature in order not to change the flow characteristids of the state-of-the-art turbine. The flow into a turbine is governed by the relation $$\frac{W\sqrt{T}}{PA} = \text{Constant,}$$

where
  W = weight flow of mixture
  T = temperature of mixture
  W = pressure of gases into turbine
  A = effective flow area designed into the turbine.

Therefore if temperature T of the gas mixture is varied, then the weight flow must be varied in inverse proportion to the square root of the temperature. If the design of the state-of-the-art turbine is not to change, then P and A are invariant and the Weight flow from the normal turbine can increase by addition of steam up to generally 5-50 percent, and preferably 5-25 percent, by weight if the gas turbine inlet temperature is reduced. The differences that the amount of steam in the gaseous mixture can make in the efficiency of the process will be more particularly explained with respect to the embodiment of FIG. 4.

Generally, the flow of steam and pressurized air passes through line 32 into the heat exchanger 36. Heat exchanger 36 is a combined heat exchanger-combustor into which there is passed fuel continuously through line 40, the fuel being one of the solid fuels mentioned previously; i.e., one that gives off corrosive gases. Further, the exhaust gases such as air and steam that are removed from turbine section 14 are passed into heat exchanger 36 through line 44. The spent gases that pass through line 44 and fuel that passes through line 40 are burned in combustor 50 and are passed into heat exchanger 36. The gaseous mixture passing through line 32 to heat exchanger 36 then is heated by the heat exchanger to a temperature in the range of a maximum of about 1200°-1500° F. which is dictated by the tolerance of the metals of which the heat exchangers are made. Such gas mixture then passes out of heat exchanger 36 through line 60 to drive power turbine section 14. The combined gases pass out of combustor-heat exchanger 36 by means of line 62 into heat recovery steam generator 64. Water is introduced into steam generator 64 through line 70. This is treated water so it does not have sufficient corrosive ingredients to affect the metal in turbine section 14. The combusted gases from heat exchanger 36 which enter steam generator 64 turn the water to steam which is collected in steam drum 72 and passed out through line 30 and mixed with the pressurized air in line 24. The cooled combusted gases then pass through line 76 from steam generator 64 into exhaust cleanup 80, from which particles are removed, whereupon the gases are exhausted to the atmosphere through line 82.

The particle cleanup or separation equipment may be a multiple stage cycling device from which the cleaned-up gases may be passed to the stack and then to the atmosphere. Solid material can contain a significant amount of unburned carbon which can be separated from the gas stream by a separator and can be recycled to the combustor if desired. This material may be, for example, fed back along with the fresh fuel coming in through line 40. Solid material is separated out and contains little unburned carbon and is sent to the ash disposal bin from exhaust cleanup 80 through line 86. It should be noted that the instant process utilizes a state-of-the-art turbine apparatus as well as other commercially established and available state-of-the-art equipment.

Further, it is possible for the state-of-the-art turbine section 14 to tolerate gases with temperatures of 1800°–2100° F.; however, such pressurized gases can be heated in the heat exchanger 36 only to temperatures from 1200° to 1500° F.

Accordingly, the pressurized air alone coming through line 24 and heated accordingly in heat exchanger 34 would not operate turbine section 14 to full capacity. By injecting steam through line 34 in the specified proportions, steam along with the pressurized air can be utilized to take up the full capacity of turbine section 14 so that maximum efficiency is obtained from the operation of turbine section 14.

By a system such as that of FIG. 1, it is possible to obtain actual power plant efficiencies approaching the theoretical efficiencies of a simple cycle direct fired gas turbine plant powered with the same fuel.

Figure 2:
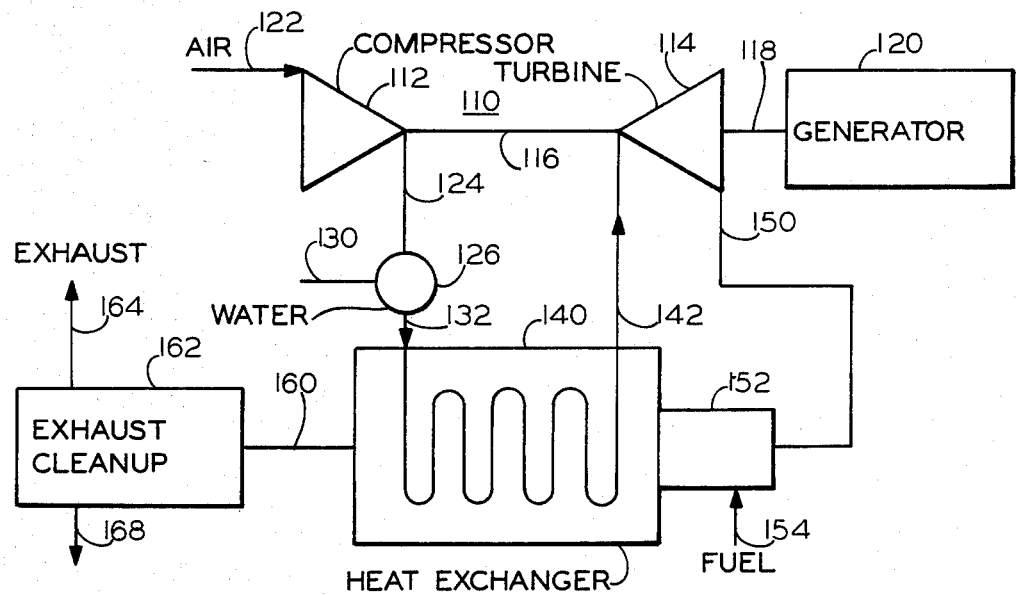
FIG. 2 is a schematic diagram of a power plant comprising a gas turbine which is powered by a mixture of water injected into air which is heated by passing them through a heat exchanger so as to change the water to steam, which heat exchanger is heated by the burning of a carbonaceous fuel or a fuel giving off corrosive gases.

An alternate embodiment of the power plant of FIG. 1 is shown in FIG. 2. In this embodiment treated water is mixed with the pressurized air from the compressor section of the gas turbine. The water is mixed with the pressurized air and is converted to steam in the heat exchanger-combustor before being passed on to drive the turbine section.

Again, it is generally possible to mix any percent by weight of water with the pressurized air. Preferably there is mixed sufficient water in the pressurized air such that there will be 5–50 percent by weight of steam in the pressurized air after the water has been converted to steam, and more preferably there will be 5–25 percent by weight of steam in the pressurized air/steam mixture after the water has been converted to steam.

Referring to the drawing, gas turbine 110 has a compressor section 112 and a turbine section 114 which are run in tandem through shafts 116 and 118 such that turbine section 114 drives, for instance, an electric generator 120 and compressor section 112. Again, preferably, air passes through line 122 into compressor section 112 where it is pressurized and then passes through line 124 to mixing chamber 126 where it is mixed with treated water passing through line 130 so as to form a mixture of pressurized air and water. This mixture then passes through line 132 into heat exchanger 140. The pressurized air and water mixture is heated in heat exchanger 140 to a temperature of about 1200°–2500° F. for the same reasons as given with respect to the apparatus of FIG. 1. The heating converts the water to steam and the resulting steam pressurized air mixture then passes through line 142 to drive turbine section 114. Again, as pointed out with respect to FIG. 1, there is preferably utilized a regenerative use of the exhaust gases coming from turbine section 114. This is desirable for the most efficient operation of the power plant of the instant invention. Accordingly, the waste air and steam that pass out of turbine section 114 pass through line 150 into combustor 152 where it is mixed with fuel passing in through line 154 wherein the entire mixture is then burned so as to be combusted and passed into heat exchanger 140 to heat the pressurized air/water mixture. The exhaust gases from heat exchanger-combustor 140, then pass through line 160 into generally the same type of exhaust cleanup 162 as in FIG. 1 wherein the exhaust gases are vented to the stack through line 164 and the ash particles are dumped in a dust bin through line 168.

A particular advantage of this arrangement is that it does not require the use of a heat recovery steam generator; however more of the heat is utilized from the combusted gases in the power plant of FIG. 1 and accordingly, the power plant of FIG. 1 is more efficient. Again, a commercial state-of-the-art gas turbine is utilized in the power plant of FIG. 2. The other equipment is also commercially established and available state-of-the-art equipment. One point should be emphasized here: the present process in the present invention is particularly efficient with small types of power plants. Particularly, the advantage of the present invention resides in its combining of steam expansion and gas expansion in a single turbine resulting in economy in terms of equipment cost and efficiency versus other methods of utilizing separate steam and gas turbines that is carried out by one of the prior art methods in which there are burned fuels which give off corrosive gases.

Accordingly, a simple gas turbine cycle is one-quarter the price of a comparable steam system while the combined cycle of the instant invention is considerably lower in price. By gas turbine cycle, it is meant the traditional gas turbine cycle for burning clean hydrocarbon fuel; by steam system it is meant the traditional steam turbine cycle for which the above relative values are given. If there is utilized one of the gas turbine cycles disclosed in the above patent for burning carbonaceous fuels that give off corrosive gases, then the above figures do not apply since those gas turbine cycles are more efficient than the traditional simple gas turbine system running at the lowered temperatures imposed by the corrosive gases limits on the heat exchanger. It should also be noted that the cost of the water versus its value in improving performance is minimal. Thus, the water value in its equivalent improvement in worth, efficiency, and output, is equal to 22 to 30 dollars per thousand gallons while the cost for purification for this application ranges from 1 to 2 dollars a thousand gallons.

Figure 3:
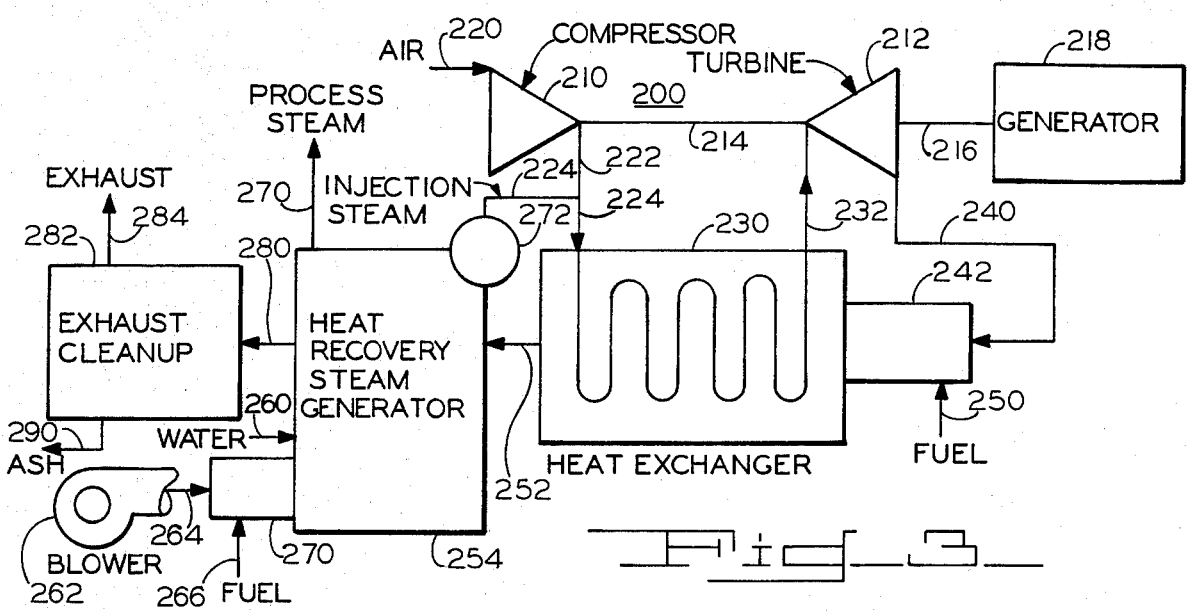
FIG. 3 is a schematic diagram of an alternate embodiment of the process of the instant invention, and particularly a slightly different embodiment but similar to the power plant of FIG. 1.

FIG. 3 is in accordance with a schematic diagram of a power plant of a slightly different embodiment than that of FIG. 1.

In this embodiment, additional fuel is burned in the steam generator so as to produce additional steam which may be utilized in other parts of an industrial plant. Accordingly, proceeding to this Figure, there is present a gas turbine 200 having a compressor section 210 and a turbine section 212 which are driven in tandem through shaft 214 and also shaft 216 for driving, for instance, an electric generator 218. In all the Figures, the turbine is shown driving a generator; however any shaft power load can be driven by the turbine. As stated previously, preferably pressurized air is introduced through line 220 into compressor section 210 whereupon it passes out through line 222 and is mixed with steam from line 224. The mixture is preferably within the range as set forth with respect to the embodiment of FIG. 1. The resulting mixture of pressurized air and steam passes through line 224 into heat exchanger 230 where it is heated to a temperature of 1200°–1500° F. for the same reasons as stated with respect to FIG. 1. Then the mixture passes out from heat exchanger 230 through line 232 to drive turbine section 212.

Regeneration is also utilized in this power plant. Thus, exhaust gases such as air, steam or water are passed through line 240 into combustor 242. In combustor 242, there also passes through line 250 the necessary fuel such as one of the carbonaceous fuels disclosed previously that produces corrosive gases. This mixture is burned and passes to heat exchanger 230 to heat the pressurized air/steam mixture that passes into the heat exchanger through line 224. The Combusted gases from heat exchanger 230 then pass through line 252 into steam generator 254. Treated water passes into steam generator 254 through line 260 as well as additional air through blower 262 and line 264 and fuel through line 266 into combustor 270. The resulting mixture is burned and passed to steam generator 254 to convert the treated water passing through line 260 into steam which is collected in steam drum 272. A portion of this steam passes out through line 224 to be mixed with pressurized air passing through line 222. Excess steam passes through line 270 to be utilized wherever necessary in an industrial plant. The combined gases from heat exchanger 230 as well as from gases burned in combustor 270 then pass out through line 280 into exhaust cleanup 282 and after being cleaned, are vented to the stack through line 284. The ashes collected in the exhaust cleanup, which can be the same exhaust cleanup as that of FIG. 1, are collected in ash bin through line 290. The advantage of this power plant over that of FIG. 1 is that it can produce greater amounts of excess steam for utilization in other parts of an industrial plant.

Again, a state-of-the-art commercially established gas turbine can be utilized for the power plant of FIG. 3. As mentioned previously, any solid fuel that produces corrosive gases and/or destructive particulate matter is preferably burned in the combustor-heat exchangers of FIGS. 1, 2, and 3. Clean hydrocarbon fuels can also be burned in such combustor chambers if it is desired to power the plant in this more costly manner for small periods of time for one reason or other.

Coal or similar carbonaceous solid fuel can be utilized to operate the power plant in the instant case. A particularly advantageous use or desirable use of coal is one in which the heat exchanger is separate from the combustor and one in which the combustor is a fluidized bed of coal. Such a power plant is shown in FIG. 6. Again, the state-of-the-art gas turbine is shown at 300 having a compressor section 310 and a turbine section 312 which are operated in tandem through shaft 314 so that turbine section 312 can drive compressor section 310. Then, through shaft 320, turbine section 312 can operate, for instance, electric generator 322. Again, preferably air passes through line 324 into compressor section 310 where it is pressurized and passes out through line 330. The presurized air passing through line 330 is mixed with steam passing through line 332 in the general or preferred proportions mentioned previously with respect to the embodiment of FIG. 1. The resulting gaseous mixture then passes through line 340 into heat exchanger 342 where it is heated to the range of 1200°–1500° F. for the same reasons as given with respect to FIG. 1; and then passes out through line 350 to drive turbine section 312. The presurized gases and steam passing through line 340 into heat exchanger 342 are heated by combusted gases passing through line 352 out of fluidized bed combustor 354. Coal and other fuel is introduced into fluidized bed combustor 354 through line 356. Gas turbine exhaust gases such as spent air and spent steam are introduced from turbine section 312 through line 358 into the bottom of fluidized bed 354.

The fluidized bed combustor 354 can be of the type disclosed in U.S. Pat. No. 4,116,005 and includes a plurality of sulfur-adsorbing particles forming a fluidized bed which is suspended above a grate by a stream of gas which passes therethrough. Sulfur-adsorbing particles preferably are calcined limestone (calcium carbonate) or dolomite calcium magnesium carbonate typically of 1/16 to ½ inch maximum dimensions. The particles capture sulfur dioxide during combustion of coal or other carbonaceous fuel and also promote heat transfer. The fluidized bed combustor includes the inlet line 358 for receiving the spent air and steam from turbine section 312. In addition to the other lines entering and leaving the combustor mentioned previously, there are fresh sulfur sorbing particles supplied to the fluidized bed combustor 354 through inlet line 366 and spent sorbing particles and ash solids are removed through exit 368. The percentage of coal in the bed is typically rather small, of the order of one percent or less by weight.

The combusted gases from fluidized bed 354 then pass through line 352 into heat exchanger 342 where they heat the pressurized air/steam passing through line 340. The combusted gases then pass out of heat exchanger 342 through line 370 into steam generator 372. Untreated water is passed through line 374 through a state-of-the-art water treatment apparatus 380 and then through line 382 into steam generator 372, where it is converted into steam by the combusted gases passing into steam generator through line 370. The steam that is formed passes through line 384 into steam drum 386 where the moisture is separated therefrom and dry steam is then passed through line 388 back into steam generator 372 where it is further heated and passed out through line 390. A portion of this superheated steam may be taken off as process steam through line 392 and the rest passed through line 332 to be combined with the pressurized air passing from compressor section 310.

The combusted gases from steam generator 372 then pass through line 393 to baghouse filter 394 to remove the rest of the particulates and impurities from the exhaust gases to environmentally acceptable levels, and particularly the sulfur particles. It is generally felt that a minimum system for coal-fired units will be a low sulfur coal and a baghouse precipitator. It should be remembered that such plants will be applicable for the least environmental restricted international installations. For the more restricted environmental installations, a sulfur removal system and a precipitator baghouse will be required. Because of the high exhaust temperatures of this cycle, the use of dry reactant sodium compounds such as sodium bicarbonate injected at the exit of the heat exchanger and captured in the baghouse 394 is suggested as the minimum cost of a sulfur control system. The baghouse filter with conventional materials currently has a limit of approximately 500° F. Therefore, the useful range of the system is now 300°–500° F. Accordingly, with respect to the above embodiments that use a heat recovery steam generator, the exhaust temperatures will be limited to 300° F. or higher. With water injection, the exhaust temperatures range from 350°–600° F. For the higher temperatures, it is suggested that an ambient air blower be added to attemperate the exhaust to less than 500° F. Such a system would also operate when the temperature exceeds a pre-established limit. The significant issue with such a system is the availability and cost of the reactant material.

A baghouse filter or electrostatic precipitator is shown in 394 for removing most of the remaining sulfur particles and other particles from combusted exhaust streams passing through line 393. In the alternative, a conventional wet and dry scrubber system might be utilized. The particles are then passed through line 398 into an ash bin while the cleaned gases pass through line 399 to the stack. This embodiment illustrates the use of superheated steam in the process as well as a baghouse filter and a coal fluidized bed. A coal fluidized bed is desirable for two reasons: first, it aids in removing the sulfur from the combustion gases; and secondly, the coal can be burned much more efficiently in a fluidized bed.

The above disclosures have been with respect to basically burning any solid fuel that gives off corrosive gases such that the combusted gases cannot be used to drive a state-of-the-art gas turbine directly, and specifically with respect to FIG. 6 with the use of coal for that purpose. Although wood can be used in the power plant configurations of FIGS. 1, 2, and 3, coal may have greater utility because of its availability and price. It should also be noted that the exhaust cleanup of the combusted gases in those Figures is preferably not a cyclone particle separator system but a baghouse precipitator in the more environmentally restricted areas.

Figure 4:
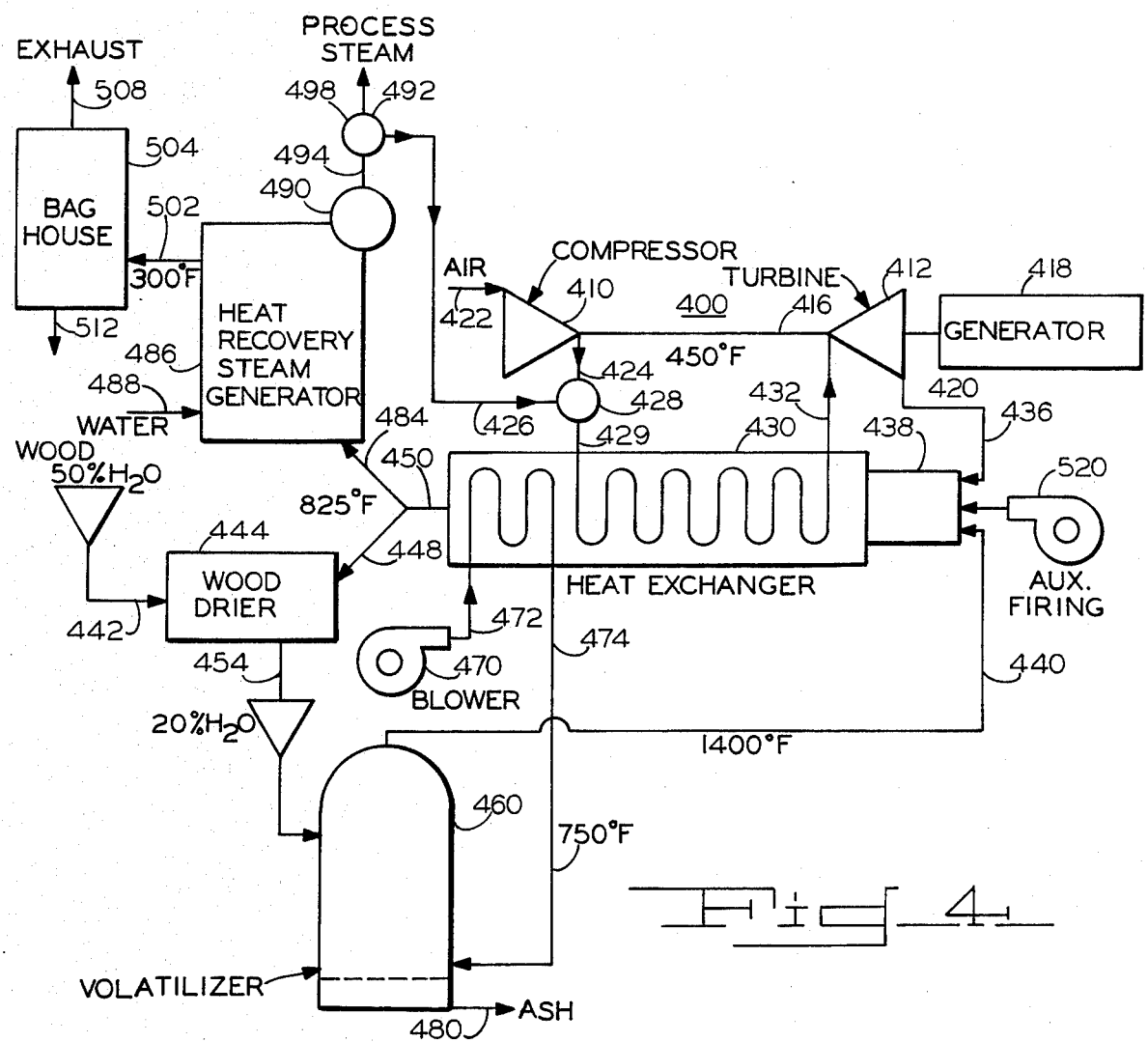
FIG. 4 is a schematic diagram of the power plant of the instant invention in which steam and heated air are utilized to drive a gas turbine which are indirectly heated in a heat exchanger-combustor which is heated by the burning of wood.

It is now desirable to describe a system in which the fuel is wood. Such a power plant configuration is shown in FIG. 4. It should only be stated that all the equipment shown in the power plants of the Figures of this application are commercially established state-of-the-art equipment, and the gas turbine is a state-of-the-art design.

A wood burning system is shown in FIG. 4 comprising a state-of-the-art gas turbine 400 having a compressor section 410 and a turbine section 412. The compressor section 410 and the turbine section 412 are constructed in tandem such that the shaft 416 drives compressor 410 and shaft 420 drives generator 418. Preferably air enters compressor section 410 through line 422 and passes out as pressurized air through line 424 where it is mixed with steam passing through line 426 in mixing chamber 428. The steam and pressurized air then pass out of mixing chamber 428 through line 429 into heat exchanger 430 where it is heated to a temperature in the range of 1200°–1500° F. and then passes through line 432 to power turbine section 412. Spent pressurized air and steam or water pass from turbine section 412 through line 436 into combustor 438 where there is also introduced wood volatiles through line 440.

The wood volatiles are obtained by passing wood which may contain about 50 percent water or more through line 442 into wood dryer 444. The wood particles in wood dryer 444 are dried by passing in contact with them a portion of the combusted gases passing through line 448 from line 450, out of heat exchanger 430. The dried wood particles along with the combusted gases and containing about 20 percent water, then pass through line 454 into wood volatilizer 460. Air is passed by blower 470 and line 472 into heat exchanger-combustor 430 where it is heated and passed out through line 474 into volatilizer 460. The air is utilized to volatilize the wood particles coming into the volatilizer through line 454 so as to convert the wood to wood volatiles and ash. The ash is passed out of the volatilizer through line 480. The volatilized wood gases and other gases are passed out the volatilizer 460 at a temperature of about 1400° F. through line 440 into combustor 438 where they are burned and passed to heat exchanger 430.

The portion of the combusted gases coming out of heat exchanger 430 that are not passed to wood dryer 444 through line 448 are passed through line 484 into steam generator 486. Treated water is introduced into steam generator 486 through line 488 where it is converted to steam and collected in steam drum 490. The water that is collected in steam drum 490 is returned to be reconverted into steam and the dry steam is then passed through separator 492 through line 494. In separator 492, steam is taken off through line 426 to be mixed with pressurized air in mixing chamber 428 to be heated in heat exchanger 430. The excess steam is taken off as process steam through line 498 to be utilized wherever necessary. The cooled combusted gases are then taken out of the steam generator 486 through line 502 into baghouse filter precipitator 504 where ash particles are removed from the combusted gases. A baghouse filter or electrostatic precipitator can be utilized to remove the particles from the spent combusted gas passing through line 502. However, since coal is not being burned and virtually no sulfur oxides are present, this is not strictly necessary and a cyclone particle separator to separate only particulates can be utilized. It is estimated that the gases passing through line 502 are within the temperature range of 300° to 400° F. from the above wood-fired system. The clean exhaust gas is then passed through line 508 through the stack while the particles pass through the ash bin through line 512. A point should be made with respect to the coal-fired plant of FIG. 6. Preferably, there is utilized the use of sulfur sorbing particle additives such as sodium bicarbonate which is added to the power plant through line 366, along with a baghouse filter or an electrostatic precipitator. Such can be in addition to the use of sulfur sorbing particles in the fluidized bed combustor. This is desired for the environmentally restricted areas. However, in other areas it may be possible to first use the insertion of the sulfur sorbing particles at the outlet of the heat exchanger in combination with the baghouse or electrostatic precipitator filters. In the alternative, it may be possible in less environmentally restricted areas to just have the use of the sulfur sorbing particles in the fluidized bed reactor without the addition of sulfur sorbing particles at the outlet of the heat exchanger in combination with a baghouse filter or electrostatic precipitator. Further, it can be appreciated that the power plant of FIG. 4 may be varied in many ways as could the embodiments of the other Figures such as in the use of water rather than steam or the elimination of process steam.

Further, the power plant of FIG. 4 can have an auxiliary firing means 520 for injecting auxiliary fuel and air into the combustor heat exchanger 430 so as to begin the operation of the system.

Further, although not shown, the heat recovery steam generator 486 of FIG. 4 may have an auxiliary firing means for producing additional heat energy in the steam generator to produce the amount of process steam that is desired.

Theoretical calculations were made with respect to power output of the gas turbine, the amount of fuel used, and steam used and other factors as to the power plant of FIG. 4. The results are set forth in Table I below for 50% moisture content wood.

TABLE I

| Steam Generator (Condition) | Steam Injection % | Fuel Used (10 BTU/hr) | Output Power (MW) | Process Steam (10 BTU/hr) | Power Only Eff. % | Cogeneration Eff. % |
|---|---|---|---|---|---|---|
| Unfired | 0 | 200 | 11.0 | 100 | 17.8 | 65.5 |
| Unfired | 5 | 240 | 14.5 | 60 | 20.6 | 45.6 |
| Unfired | 10 | 250 | 17.5 | 20 | 23.9 | 31.9 |

TABLE I-continued

| Steam Generator (Condition) | Steam Injection % | Fuel Used (10 BTU/hr) | Output Power (MW) | Process Steam (10 BTU/hr) | Power Only Eff. % | Cogeneration Eff. % |
|---|---|---|---|---|---|---|
| Unfired | 12 | 257 | 18.5 | 0 | 24.6 | — |
| Partial Fired* | 15 | 295 | 21.0 | 0 | 24.3 | — |
| Partial Fired* | 20 | 355 | 23.5 | 0 | 22.6 | — |
| Full Fired* | 0 | 330 | 11.0 | 215 | 11.4 | 76.5 |
| Full Fired* | 5 | 370 | 14.5 | 185 | 13.4 | 63.4 |
| Full Fired* | 10 | 407 | 17.5 | 165 | 14.7 | 55.2 |
| Full Fired* | 15 | 448 | 20.5 | 147 | 15.6 | 48.4 |
| Full Fired* | 20 | 470 | 23.5 | 125 | 17.1 | 43.7 |

*Supplimentary fired in the Heat Recovery Steam Generator or the inlet ducting of such Generator.

As the results show, it will be possible to obtain a power only efficiency of as high as 24 percent. Cogeneration efficiency is defined here as the ratio of the sum of the power plus one half the process heat divided by the fuel input heat.

The results of Table I were obtained from theoretical calculations only. The power plant of FIG. 4 can be fired with any wood or related materials such as bark, bagasse, vegetable and grain residues. Further, even though the economics of present power plants are more desirable when the power plant is small, i.e., within the range of 100 megawatts, nevertheless the efficiency of the system and the utility of the power plant applies throughout the ranges of gas turbines from small to large.

In the above figures, partial fired means the combustion of some additional auxiliary fuel in the heat recovery steam generator or its inlet ducts and full fired means the combination of the maximum allowable auxiliary fuel as limited by duct and heat recovery steam generator temperatures.

As data indicates in Table I, there can be obtained a fairly efficient power plant using state-of-the-art equipment and particularly a commercially-established state-of-the-art gas turbine, by operating a state-of-the-art gas turbine with a combination of steam and pressurized air. As pointed out previously, there can be various modifications of the power plant of FIG. 4. The system that is shown in FIG. 4 is one proposed system for burning wood and may be varied for various reasons. For instance, instead of steam, water may be utilized and the baghouse filter may be replaced by another gas particle remover.

Theoretical calculations have also been carried out with an alternate embodiment of the plant coal system of FIG. 6 in which there is utilized a simple coal burner in which there is burned a 70/30 coal/water slurry with the spent gases from the turbine section.

In the embodiment in which theoretical calculations were made, there was not utilized a fluidized bed. The result of these calculations are listed in Table II below.

TABLE II

COAL FIRED TURBINE SYSTEM

| | Water Injection | | | |
|---|---|---|---|---|
| | 0% | 5% | 10% | 15% |
| Air Flow (PPS) | 115.6 | 115.6 | 115.6 | 115.6 |
| Turbine Inlet Temp. (°F.) | 1450 | 1450 | 1450 | 1450 |
| Burner Outlet Temp. (°F.) | 1525 | 1570 | 1650 | 1675 |
| Heat Exchanger Exhaust Temp. (°F.) | 615 | 450 | 410 | 370 |
| Water Use (Gallon/hr.) | 0 | 2500 | 5000 | 7500 |
| Output (MW) | 5.52 | 7.18 | 9.03 | 10.5 |
| Dry Coal Efficiency (Overall Coal to Busbar) (%) | 22.0 | 25.0 | 26.7 | 29.2 |
| Coal/Water Slurry Efficiency (%) (70%-30%) | 21.3 | 24.2 | 25.3 | 28.3 |

As the results of Table II indicate, such a coal-fired system can be very efficient with 15 percent water injection. This theoretical efficiency should apply to the system of FIG. 6.

Figure 5:
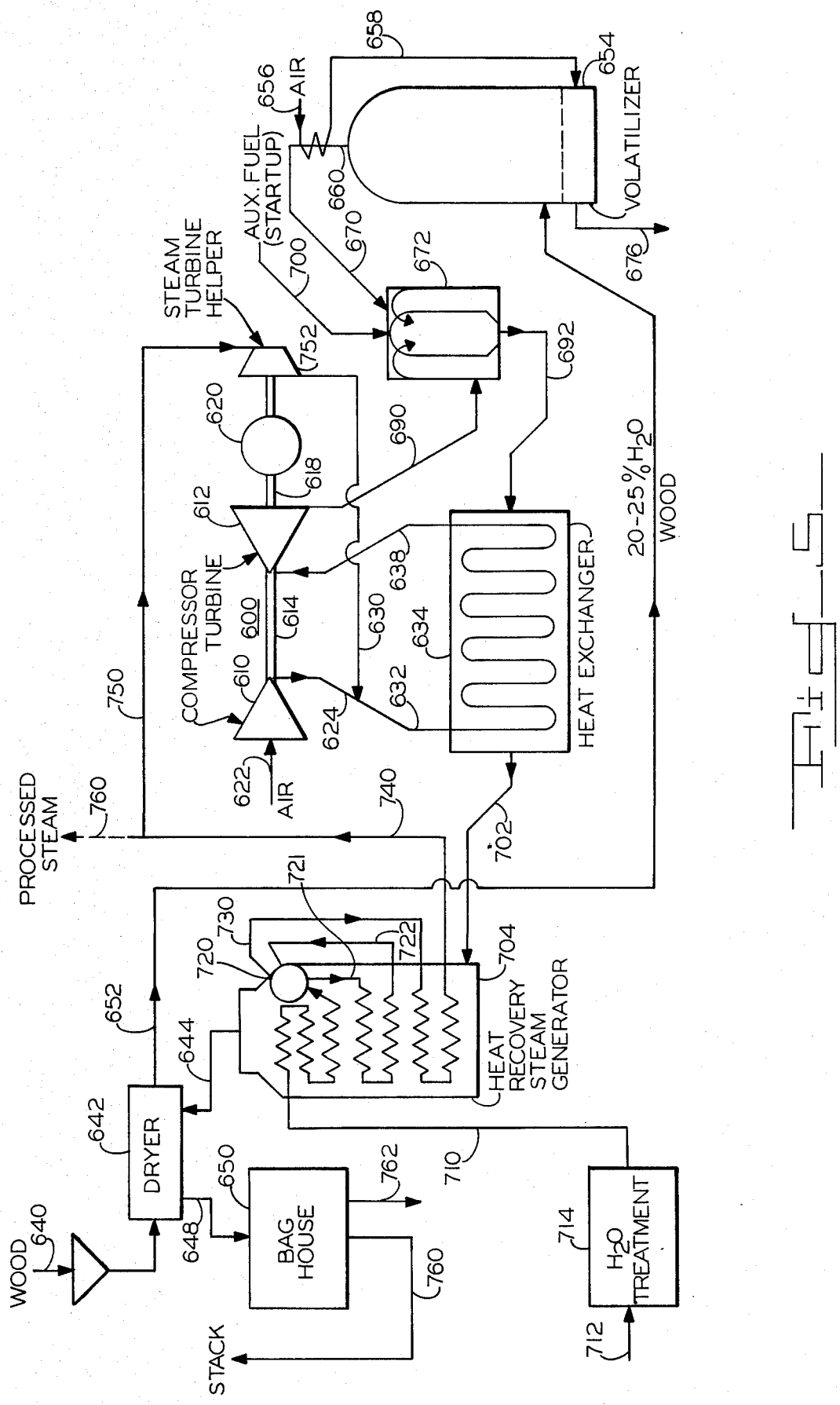
FIG. 5 is a schematic diagram of an alternate embodiment in which the gas turbine is powered by a combined mixture of steam and air which are heated by passing through a heat exchanger which is heated by the burning of wood.

Now, proceeding to FIG. 5; FIG. 5 is a slightly different power plant from the embodiment of FIG. 4 in which wood is burned.

In this power plant, there is a gas turbine 600 having a compressor section 610 and a turbine section 612 which are connected in tandem to a shaft 614 so as to operate compressor section 610 and to another shaft 618 to power, for instance, electric generator 620. Air enters compressor section 610 through line 622, is compressed into pressurized air which passes out through line 624 which is mixed with superheated, saturated or wet steam and water passing through line 630, which mixture of steam and pressurized air then passes through line 632 into heat exchanger 634. The pressurized air and steam is then heated to exchanger 634 to a temperature in the range of 1200°-1500° F. and passed back through line 638 into turbine section 612 to power the turbine section.

Wood particles which may contain 50 percent or more water by weight are passed through line 640 into dryer 642, which are dried by the passing therethrough of spent combustion gases through line 644, which spent combustion gases along with retained moisture pass out of dryer 642 through line 648 into baghouse filter 650. The dried wood which is dried to about the same level as that in the process of FIG. 4 then passes through line 652 into volatilizer 654 where devolatization and partial oxidation occur. Air is introduced in line 656 and passes to line 658 into the bottom of volatilizer 654 used to volatilize the wood. Volatilized wood gases pass out of volatilizer 654 through line 660 exchanging heat with and being partially cooled by airstream 656 before being ducted through line 670 into combustor 672. Ash is removed from volatilizer 654 through line 676. Combustor 672 also receives the spent gases from turbine section 612 through line 690. The resulting mixture is burned in combustor 672 and the combusted gases are passed through line 692 to heat exchanger 634 to heat the mixture of pressurized air and injected steam passing into heat exchanger 634 through line 632. In FIG. 5 there is shown an auxiliary fuel startup system which passes an air/fuel mixture through line 700 into combustor 672 so as to start up the system.

The combusted gases pass out of heat exchanger 634 through line 702 into heat recovery generator 704 so as to turn into steam treated water which passes into steam generator 704 through line 710. The treated water that is in line 710 is obtained by taking untreated water through line 712 and passing it through a water treating apparatus 714. The treated water that passes into steam generator 704 is then turned into steam from the heat of combusted gases passing into steam generator 704 through line 702 whereupon it is collected in steam drum 720. The entrained water is removed from the steam in steam drum 720 and is returned to the evaporator coils of steam generator 704 through line 721 so as to be converted to steam and returned to the steam drum through line 722. Saturated steam is taken out of steam drum 720 and passed through line 730 back into steam generator 704 so as to be superheated. The superheated steam is then taken out of steam generator 704 through line 740 where a portion of it—or as much as is desired—is transmitted through line 750 to drive steam turbine helper 752. The rest of the steam is taken through line 760 as process steam to be utilized in the plant wherever desired. The spent steam is then passed from steam turbine helper 752 through line 630 to be combined with the pressurized air from line 624 so as to be transmitted to heat exchanger 634 to be heated to drive turbine section 612.

It should be noted that the temperatures given for the power plant of FIG. 4 along the lines are estimates of probable temperatures, and that these probable temperatures for that portion of the process would probably apply to the plant layout of FIG. 5.

Finally, the spent combustion gases pass through line 648 into baghouse or electrostatic precipitator filter 650 where the ash particles are removed. The particle free air is then passed through line 760 to the stack and the ash passes to an ash bin through line 762.

Other particle separators can be utilized in this embodiment such as, for instance, cyclone particle separators since coal is not being fired in the system.

The foregoing embodiments have been disclosed as preferred embodiments within the scope of the instant invention. They are not meant to be all encompassing. Various modifications may be made in these embodiments of the preferred power plants for utilization of the instant invention. The temperatures and the efficiencies that have been disclosed above are theoretical and have been shown for a particular assumed set of conditions. It is important to note again that commercially established state-of-the-art gas turbine, operated at derated turbine inlet temperatures, will be utilized in these power plants and that the other plant components represent commercially established equipment. Further; irrespective of the set of conditions assumed, it should be noted that the theoretical calculations show that the efficiency of a state-of-the-art gas turbine powered in accordance with the instant invention will be quite high when wood is burned, and will be even higher when coal is burned.

Further, the temperatures that have been shown above for the system, as well as the flow rates in the data and drawings are exemplary only and are meant to be used as guides since these can vary in accordance with the system, the output desired, and the manufacturer's specifications on a particular piece of equipment. It is only necessary to emphasize one aspect of the power plants of the instant case and the process for operating them; and, that is the amount of steam that is utilized in the presurized air/steam mixture. Thus, if steam is introduced into the system, and/or where there is water which eventually turns into steam, it is desirable that in the mixture of the pressurized gas and steam that there be from 5–50 percent by weight of steam and more preferably, from 5–25 percent by weight of steam. The more preferable and the most preferable percentages yield a power plant that is operated with the highest efficiency; i.e., the gas turbine is operated with highest efficiency. In the case when water is injected into the pressurized air which later turns into steam, it is desired that steam before entering the gas turbine have the foregoing concentrations in the pressurized air/steam mixture since this results in operation of the turbine section at maximum efficiency.

Further, it is desirable that the pressurized air/steam mixture be heated to a temperature in the range of 1200°–1500° F. before it is passed to power the gas turbine. The higher the temperature limitations of the heat exchanger, the higher the gas can be heated and the higher can be the efficiency of the system. It is desirable for the gases to be heated to as high a temperature as possible within the temperature limitations of the heat exchanger.

Further, other modifications can be made in the power plants of the instant invention and processes for operating them to meet a particular need or to increase the efficiency of a system either before or after it is in operation in a manner well known by workers skilled in the art.

What we claim is:

1. An improved gas turbine power plant using a state-of-the-art gas turbine comprising:
   (A) a state-of-the-art gas turbine apparatus having at least one gas-driven turbine section and a compressor section driven by the turbine section for supplying a first pressurized gaseous stream;
   (B) a combustor for burning a carbonaceous fuel or wood to form combusted gases to provide heat energy for driving the turbine section;
   (C) at least a first heat exchanger means for transferring a portion of the heat energy provided by said combusted gases in said combustor to said pressurized gaseous stream; and
   (D) at least, a first heat recovery steam generator which converts water to a first steam flow wherein said first steam flow is mixed with the pressurized gaseous stream from said compressor section to form a gaseous mixture and wherein said gaseous mixture is fed to said turbine section and is discharged therefrom as an exhaust gas stream.

2. The improved power plant of claim 1 wherein said heat exchanger has a first conduit inlet for receiving said first pressurized gaseous stream, a said first steam flow and a second conduit outlet for passing out said gaseous mixture, a third conduit inlet for receiving said combusted gases from said combustor, and a fourth conduit outlet for passing said combusted gases from said heat exchanger.

3. The improved power plant of claim 2 wherein said first heat exchanger is separate from said combustor and said combustor having a first conduit inlet into said combustor wherein there is fed the exhaust gases from said turbine section, and a second conduit inlet into said combustor in which there is fed the fuel, and a third conduit outlet from said combustor from which is passed said combusted gases into said heat exchanger.

4. The improved power plant of claim 3 wherein said heat recovery steam generator has a first conduit inlet for receiving the combusted gases from said heat exchanger and a second conduit inlet for receiving water and a third conduit outlet for passing steam formed in said steam generator.

5. The improved power plant of claim 4 wherein said first steam generator has a fourth conduit outlet for passing the combusted gases into a cleanup means for removal of particulates from said stream of combusted gases, said cleanup means having a first conduit inlet for said combusted gases from said steam generator and a second conduit outlet for discharging said combusted gases.

6. The improved power plant of claim 5 further including heat generating means in said steam generator having in addition a fifth conduit inlet for receiving fuel, a sixth conduit inlet for receiving air to convert additional amounts of said water passing through said second conduit inlet into steam, and a seventh conduit outlet in said steam generator for removing process steam.

7. The improved power plant of claim 1 wherein the carbonaceous fuel is a water slurry of coal.

8. An improved gas turbine power plant using a state of the art gas turbine in which heat energy is supplied by burning wood comprising:
(A) a state of the art gas turbine apparatus having at least one gas-driven turbine section and a compressor section for supplying a first pressurized gaseous stream;
(B) a combustor for burning wood volatilized gases to form combusted gases to provide heat energy for driving the turbine;
(C) at least a first heat exchanger means for transferring a portion of the heat energy provided by said combusted gases to said pressurized gaseous stream;
(D) at least a first heat recovery steam generator which converts water to a first steam flow wherein said first steam flow is mixed with the pressurized gaseous stream from said compressor section to form a gaseous mixture and wherein said gaseous mixture is fed to drive said turbine section; and
(E) at least one wood volatilizer means having a first conduit inlet for receiving wood particles, a second conduit inlet for receiving hot air heat from said first heat exchanger means, a third conduit outlet for passing wood volatilized gases from said volatilizer means to said combustor, and a fourth conduit outlet for removing ash.

9. The improved power plant of claim 8 wherein there is further present wood dryer means having a first conduit inlet for receiving wood particles and a second conduit inlet for passing a portion of the combusted gases from said combustor to said dryer means and a third conduit outlet for passing dried wood particles from said dryer means to said volatilizer.

10. The improved power plant of claim 9 wherein said heat exchanger means has a first conduit inlet for receiving said first pressurized gaseous stream, said first steam flow and a second conduit outlet for passing out said gaseous mixture to said turbine section, a third conduit inlet for receiving said combusted gases from said combustor and a fourth conduit outlet for passing said combusted gases therefrom.

11. The improved power plant of claim 10 wherein said first heat exchanger is combined with said combustor and said combustor having a first conduit inlet into said combustor for receiving the exhaust gases from said turbine section, and a second conduit inlet into said combustor for receiving volatilized gases from said third conduit outlet from said volatilizer means, and a third conduit outlet from said combustor from which pass the combusted gases into said third conduit inlet in said heat exchanger means, and said fourth conduit outlet from said heat exchanger means for passing out the combusted gases, a portion of which pass to the second conduit inlet of said volatilizer means and the rest of which gases go to the first steam generator.

12. The improved power plant of claim 10 wherein said first heat recovery steam generator has a first conduit inlet for receiving the combusted gases from said fourth conduit outlet from said first heat exchanger means, a second conduit inlet for receiving water, and a third conduit outlet for passing steam formed in said steam generator so as to mix it with said first pressurized gaseous stream.

13. The improved power plant of claim 12 wherein said first steam generator has a fourth conduit outlet for passing said combusted gases into cleanup means for removing particles from the said combusted gases, said cleanup means having a first conduit inlet for said combusted gases from the first steam generator, and a second conduit outlet for discharging said combusted gases.

14. The improved power plant of claim 13 further including additional heat generating means for said first steam generator which has in addition a fourth conduit inlet for receiving the fuel, and a fifth conduit inlet for receiving air to burn in said additional heat generating means to convert additional amounts of said water passing through the second conduit inlet in said first steam generator into steam, and a sixth conduit outlet in said first steam generator means for removing process steam.

15. The improved power plant of claim 11 wherein in said combined heat exchanger, combustor said combustor has a fourth conduit inlet for receiving heat energy from an auxiliary heat energy means.

16. The improved power plant of claim 14 wherein said first heat exchanger has a fifth conduit inlet for receiving air, means for passing air through said fifth conduit inlet and said first heat exchanger has a sixth conduit outlet for passin the heated air into the second conduit inlet in said volatilizer.

17. The improved power plant of claim 10 wherein said first heat exchanger means is separate from the combustor and wherein the combustor has a first conduit inlet into which is fed exhaust gases from said turbine section, and a second conduit inlet into which is fed the volatilized gases from said third conduit outlet from said volatilizer means, and a third conduit outlet from said combustor from which passes the combusted gases into said third conduit inlet in said first heat exchanger means, and a fourth conduit outlet in said heat exchanger means from which pass the combusted gases, a portion of which pass to the second conduit inlet of the volatilizer means and the rest of said combusted gases pass to the steam recovery generator.

18. The improved power plant of claim 17 wherein there is further included wood dryer means having said first conduit inlet for receiving wood particles, and said second conduit inlet for receiving the combusted gases and a third conduit outlet for passing dried wood particles to said volatilizer means.

19. The improved power plant of claim 18 further wherein said combustor has a fourth conduit inlet for receiving auxiliary heat ehergy.

20. The improved power plant of claim 19 wherein said first heat exchanger is separate from said combustor and in which in said first conduit inlet of said heat exchanger means there is fed the combusted gases from the third conduit outlet of said combustor and from said second conduit outlet of said heat exchanger means then passes the combusted gases into a first conduit inlet in said steam generator, and from a second conduit outlet in said steam generator means there passes the combusted gases into said second conduit inlet of said dryer means.

21. An improved gas turbine power plant having a combustor for burning a carbonaceous fuel to form combusted gases to provide heat energy for driving a gas turbine,
   (A) at least a first heat exchanger means for transferring a portion of the heat energy provided by combustion of said carbonaceous fuel to a pressurized gas stream;
   (B) at least a first heat recovery steam generator which converts water to a first steam flow wherein said steam flow is mixed with a first pressurized gas stream to form a gaseous mixture, and said gaseous mixture is fed to a gas turbine apparatus characterized in the improvement comprising a state-of-the-art gas turbine having at least one gas-driven turbine section and a compression section and which compression section pressurizes and supplies a gaseous mixture of the first pressurized gas stream and the first steam flow to drive the turbine section.

22. An improved gas turbine power plant using a gas turbine having a compression section and turbine sectionin which the heat energy is supplied by burning wood, with a combustor for burning wood volatilized gases to form combusted gases to provide heat energy for driving the turbine;
   (A) at least a first heat exchanger means for transferring a portion of the heat energy provided by said combusted gases to a first pressurized gas stream;
   (B) at least a first heat recovery steam generator which converts water to a first steam flow wherein said first steam flow is mixed with a pressurized gas stream to form a gaseous mixture and in which such gaseous mixture is fed to operate the turbine section; and
   (C) at least one volatilizer means having a first conduit inlet for receiving wood particles, a second conduit inlet for receiving hot air from said first heat exchanger means, a third conduit outlet for passing wood volatilized gases from said volatilizer to said combustor, and a fourth conduit outlet for removing ash, characterized in the improvement, comprising, in that there is utilized a state-of-the-art gas turbine which has a compressor section for supplying a first pressurized gaseous stream which pressurized gaseous stream is mixed along with the first steam flow which is then used to drive the turbine section.

23. A process for operating a gas turbine power plant using a gas turbine in which the heat energy is supplied by burning wood, comprising:
   (a) passing a gas through the compressor section of a gas turbine apparatus having at least one gas-driven turbine section and a compressor section for supplying a first pressurized gas stream;
   (b) passing spent gases from said turbine section through a first conduit inlet in a combustor;
   (c) passing wood volatilized gases to a second conduit inlet in said combustor, burning said volatilized gases to form combusted gases and transmitting out of a third conduit outlet from said combustor, said combusted gases;
   (d) discharging said combusted gases from said combustor to a first heat exchanger means through a first conduit inlet and passing the combusted gases from said heat exchanger through a second conduit outlet;
   (e) passing said pressurized gaseous stream from said compressor section along with a steam flow that is mixed with the gaseous stream to form a gaseous mixture through a third conduit inlet;
   (f) heating said gaseous mixture in said first heat exchanger means and passing said gaseous mixture out of a fourth conduit outlet in said heat exchanger means to drive said turbine section;
   (g) receiving said combusted gases from the second conduit outlet in said heat exchanger through a first conduit inlet in said steam generator means, receiving water through a second conduit inlet and converting said water to said steam flow; and passing said steam flow through a third conduit outlet from said steam generator means;
   (h) mixing said steam flow with said first pressurized gases prior to the gaseous mixture passing through the first conduit inlet in said heat exchanger;
   (i) discharging said combusted gases from a fourth conduit outlet in said steam generator means;
   (j) passing wood particles to a first conduit inlet in at least one volatilizer means which convert said wood particles to wood volatiles and ash; and
   (k) removing the ash from the second conduit outlet in said volatilizer and passing the wood volatiles through a third conduit outlet to said second conduit inlet means in said combustor so as to provide the fuel that is burned in said combustor.

24. The process of claim 23 further comprising passing said combusted gases from said steam generator into cleanup means for removing particles from said combusted gases.

25. The process of claim 23 further comprising burning additional fuel in said steam generator so as to produce additional heat energy; and converting additional amounts of water into steam and utilizing the excess steam as process steam.

26. The process of claim 25 further, comprising, passing a portion of said combusted gases from said heat exchanger through a wood dryer means to dry said wood, prior to the wood being transmitted to said volatilizer; and passing the moisture and combusted gases from said dryer means to a cleanup means.

* * * * *